(12) United States Patent
Wang et al.

(10) Patent No.: US 8,300,586 B2
(45) Date of Patent: Oct. 30, 2012

(54) WIRELESS BROADBAND RESOURCE ALLOCATION INDEXING

(75) Inventors: Ping Wang, Beijing (CN); Roshni M. Srinivasan, Palo Alto, CA (US); Hujun Yin, Saratoga, CA (US); Huaning Nin, Milpitas, CA (US)

(73) Assignee: Intel Corporation, Santa Clara, CA (US)

( * ) Notice: Subject to any disclaimer, the term of this patent is extended or adjusted under 35 U.S.C. 154(b) by 315 days.

(21) Appl. No.: 12/638,417

(22) Filed: Dec. 15, 2009

(65) Prior Publication Data
US 2011/0141980 A1    Jun. 16, 2011

(51) Int. Cl.
*H04W 4/00*    (2009.01)

(52) U.S. Cl. .................. 370/329; 370/252; 370/338

(58) Field of Classification Search ........... 370/252–253, 370/329–338, 352–356, 342
See application file for complete search history.

(56) References Cited

U.S. PATENT DOCUMENTS
2010/0260128 A1 * 10/2010 Cho et al. ............... 370/329
2011/0134861 A1 *  6/2011 Seo et al. ............... 370/329
* cited by examiner

*Primary Examiner* — Pao Sinkantarakorn
*Assistant Examiner* — Iqbal Zaidi
(74) *Attorney, Agent, or Firm* — Schwegman, Lundberg & Woessner, P.A.; Gregory J. Gorrie

(57) ABSTRACT

Wireless broadband resource allocation indexing is generally presented. In this regard a method is introduced comprising determining a total number of allowable continuous logical resource unit (LRU) allocations for a bandwidth, removing allowable allocations to generate a set of allocations that can be indexed with fewer bits than the total number of allowable allocations, and storing an index of the set of allocations in a memory. Other embodiments are also disclosed and claimed.

9 Claims, 6 Drawing Sheets

| Bandwidth | Number of LRU's | Total Number of Allowable Allocations | Number of Bits Required to Index all Allocations | Number of Bits Required to Index Reduced Set of Allocations | Number of Allocations Removed from Allowable Set |
|---|---|---|---|---|---|
| 5 MHz | 24 | 300 | 9 | 8 | 44 |
| 10 MHz | 48 | 1176 | 11 | 10 | 152 |
| 20 MHz | 96 | 4656 | 13 | 12 | 560 |
| 20 MHz | 96 | 4656 | 13 | 11 | 2608 |

WIRELESS BROADBAND RESOURCE ALLOCATION INDEXING

BACKGROUND OF THE INVENTION

In an orthogonal frequency division multiplexing (OFDMA)-based cellular radio interface, such as IEEE Std 802.16-2009, which may herein be referred to as the "IEEE Std 802.16-2009" or "WiMAX" standards, a base station may allocate uplink and downlink transmissions to one or more base stations. These transmissions may be partitioned into logical resource units (LRU's) that may be used individually or grouped together for greater flexibility. However, this flexibility in communications may add overhead to the required signaling of allocations.

BRIEF DESCRIPTION OF THE DRAWING

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
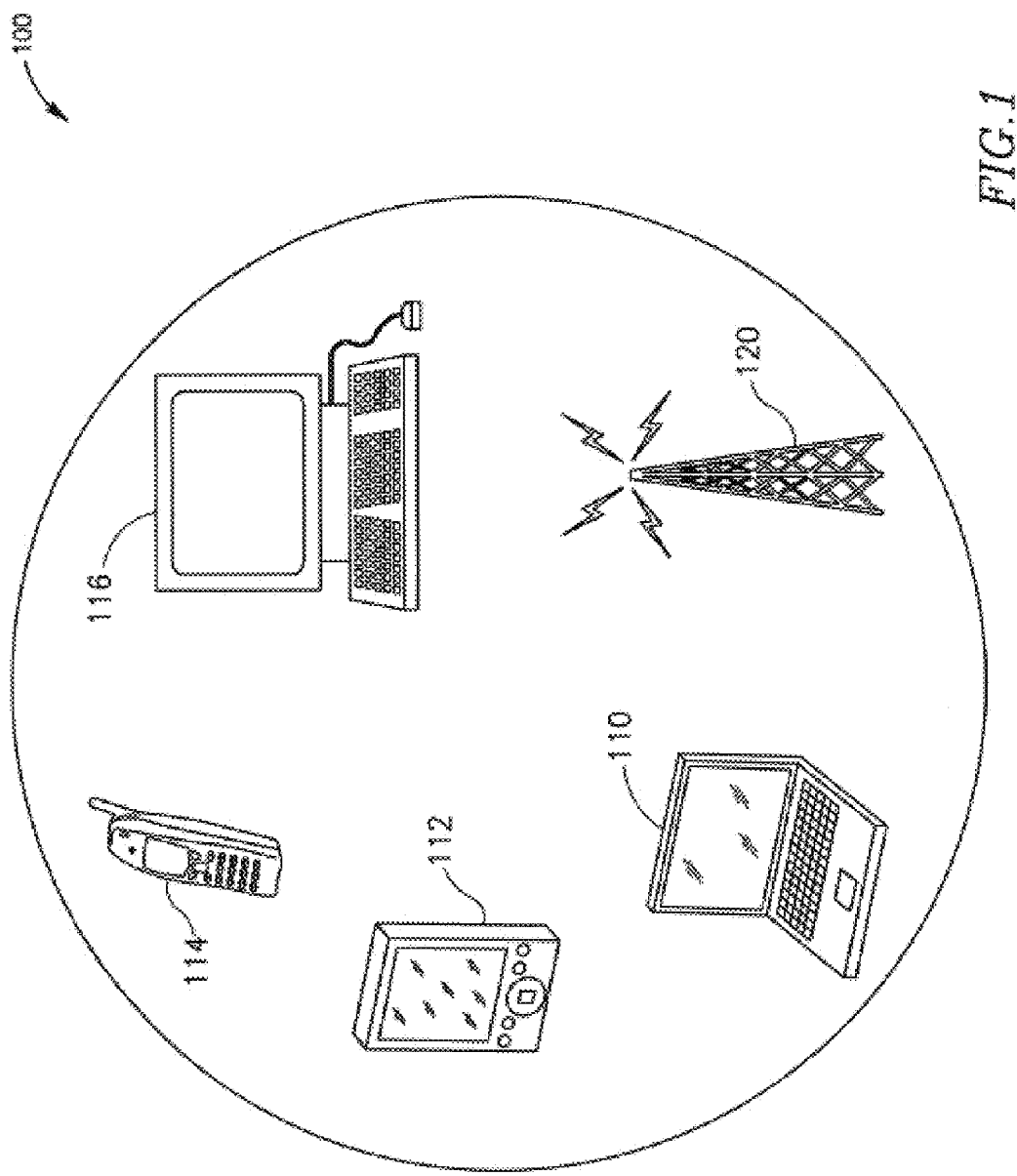
FIG. 1 is a schematic illustration of a wireless network according to an embodiment of the present invention.

It will be appreciated that for simplicity and clarity of illustration, elements shown in the drawings have not necessarily been drawn accurately or to scale. For example, the dimensions of some of the elements may be exaggerated relative to other elements for clarity or several physical components included in one functional block or element. Further, where considered appropriate, reference numerals may be repeated among the drawings to indicate corresponding or analogous elements. Moreover, some of the blocks depicted in the drawings may be combined into a single function.

DETAILED DESCRIPTION OF THE INVENTION

In the following detailed description, numerous specific details are set forth in order to provide a thorough understanding of the invention. However it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. In addition, the term "plurality" may be used throughout the specification to describe two or more components, devices, elements, parameters and the like.

While the following detailed description may describe various embodiments of the present invention in relation to wireless networks utilizing orthogonal frequency division multiplexing (OFDM) modulation, the embodiments of present invention are not limited thereto and, for example, may be implemented using other modulation and/or coding schemes where suitably applicable. Further, while example embodiments are described herein in relation to wireless metropolitan area networks (WMANs), the invention is not limited thereto and can be applied to other types of wireless networks where similar advantages may be obtained. Such networks specifically include, but are not limited to, wireless local area networks (WLANs), wireless personal area networks (WPANs), and/or wireless wide area networks (WWANs).

The following inventive embodiments may be used in a variety of applications including transmitters and receivers of a radio system, although the present invention is not limited in this respect. Radio systems specifically included within the scope of the present invention include, but are not limited to, network interface cards (NICs), network adaptors, mobile stations, base stations, access points (APs), gateways, bridges, hubs and cellular radiotelephones. Further, the radio systems within the scope of the invention may include cellular radiotelephone systems, satellite systems, personal communication systems (PCS), two-way radio systems, two-way pagers, personal computers (PCs) and related peripherals, personal digital assistants (PDAs), personal computing accessories and all existing and future arising systems which may be related in nature and to which the principles of the inventive embodiments could be suitably applied.

Reference is made to FIG. 1, which schematically illustrates a wireless network 100 according to an embodiment of the present invention. Wireless network 100 may include provider network (PN) 120, a base station (BS) 118, and one or more subscriber or other stations 110, 112, 114, and/or 116, which may be for example mobile or fixed subscriber stations. In some embodiments, base station 118, for example, in WLANs, may be referred to as an access point (AP), terminal, and/or node, and subscriber stations 110, 112, 114, and/or 116 may be referred to as a station (STA), terminal, and/or node. However, the terms base station and subscriber station are used merely as an example throughout this specification and their denotation in this respect is in no way intended to limit the inventive embodiments to any particular type of network or protocols.

Wireless network 100 may facilitate wireless access between each of subscriber stations 110, 112, 114, and/or 116 and PN 120. For example, wireless network 100 may be configured to use one or more protocols specified in by the Institute of Electrical and Electronics Engineers (IEEE) 802.11™ standards ("IEEE Standard for Wireless LAN Medium Access Control (MAC) and Physical Layer (PHY) Specification. 1999 Edition", reaffirmed Jun. 12, 2003), such as IEEE 802.11a™-1999; IEEE 802.11b™-1999/Cor1-2001; IEEE 802.11g™-2003; and/or IEEE 802.11n™, in the IEEE 802.16™ standards ("IEEE Standard for Local and Metropolitan Area Networks—Part 16: Air Interface for Fixed Broadband Wireless Access System", Oct. 1, 2004), such as IEEE 802.16-2004/Cor1-2005 or IEEE Std 802.16-2009, which may herein be referred to as the "IEEE Std 802.16-2009" or "WiMAX" standards, and/or in the IEEE 802.15.1™ standards ("IEEE Standard for Local and Metropolitan Area Networks—Specific Requirements. Part 15.1: Wireless Medium Access Control (MAC) and Physical Layer (PHY) Specifications for Wireless Personal Area Networks (WPANs™)", Jun. 14, 2005), although the invention is not limited in this respect and other standards may be used. In some embodiments, attributes, compatibility, and/or functionality of wireless network 100 and components thereof may be defined according to, for example, the IEEE 802.16 standards (e.g., which may be referred to as a worldwide interoperability for microwave access (WiMAX)). Alternatively or in addition, wireless network 100 may use devices and/or protocols that may be compatible with a $3^{rd}$ Generation Partnership Project (3GPP) Long Term Evolution (LTE) cellular network or any protocols for WPANs or WWANs.

Embodiments of the invention may enable the next generation of mobile WiMAX systems (e.g., based on IEEE 802.16m standard) to efficiently support substantially high mobility and low latency applications, such as, for example, Voice-over-Internet Protocol (VoIP), interactive gaming over the air-interface, deployment in larger cell-sizes or lower frequency bands, and/or "multi-hop" relay operations, while enabling backward compatible operations and integration with reference standards (e.g., the legacy mobile WiMAX systems based on IEEE Std 802.16-2009).

In some embodiments, base station 118 may manage and/or control wireless communications among subscriber stations 110, 112, 114, and/or 116 and between subscriber stations 110, 112, 114, and/or 116 and provider network 120. Subscriber stations 110, 112, 114, and/or 116 may, in turn, facilitate various service connections of other devices (not shown) to wireless network 100 via a private or public local area network (LAN), although the embodiments are not limited in this respect.

Figure 2:
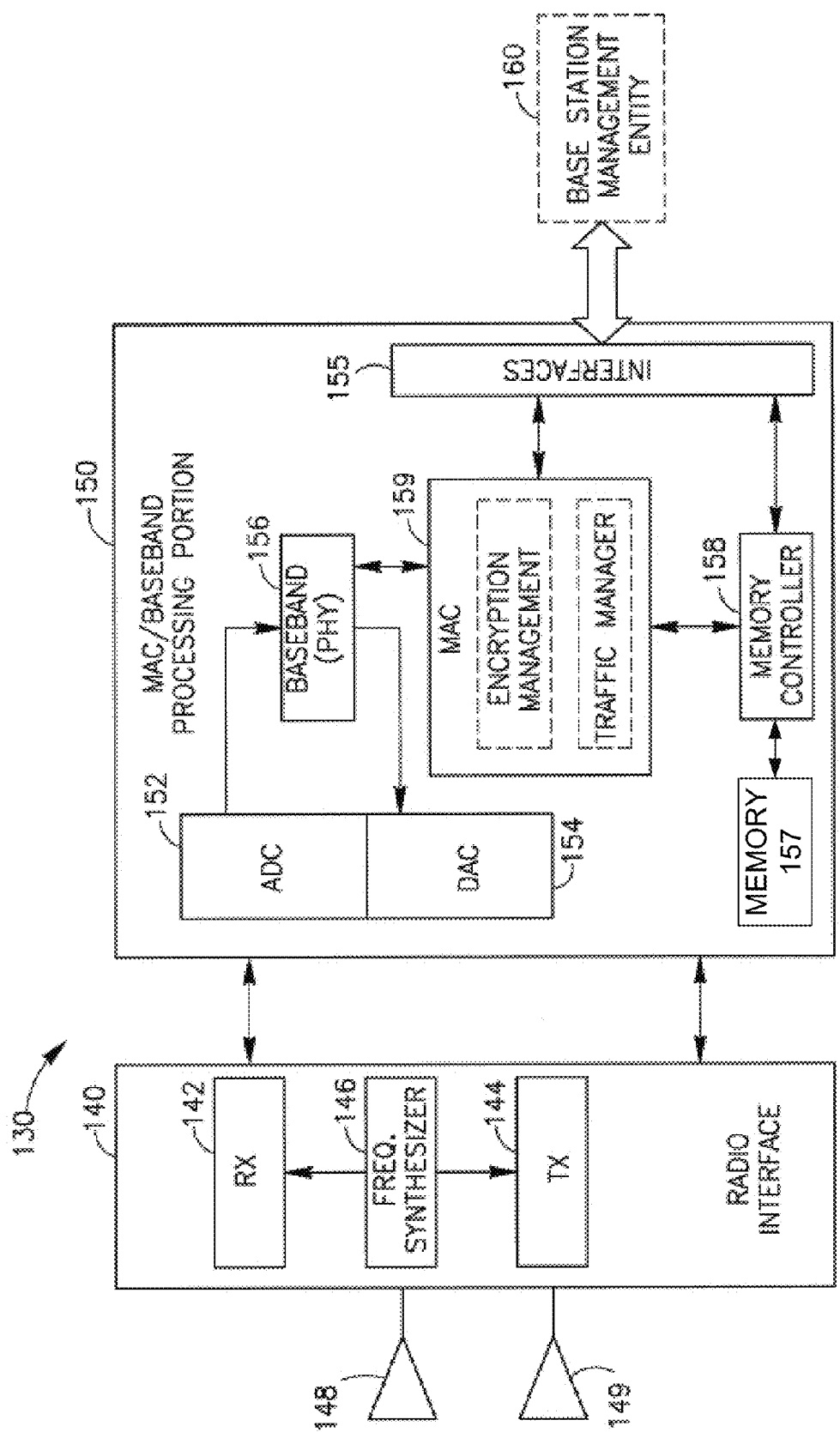
FIG. 2 is a schematic illustration of an apparatus for use in a wireless network according to an embodiment of the present invention.

Reference is made to FIG. 2, which schematically illustrates an apparatus 130 for use in a wireless network according to an embodiment of the invention. For example, apparatus 130 may be a terminal, device, or node (e.g., one of subscriber stations 110, 112, 114, and/or 116, base station 118, and/or provider network 120, described in FIG. 1) for communicating with other terminals, devices, or nodes, in a wireless network (e.g., wireless network 100, described in FIG. 1). Apparatus 130 may include a controller or processing circuit 150 including logic (e.g., including hard circuitry, processor and software, or a combination thereof) to determine the false frame detection rate and/or adjust the sensitivity of frame detection as described in one or more embodiments of the invention. In some embodiments, apparatus 130 may include a radio frequency (RF) interface 140 and/or a medium access controller (MAC)/baseband processor circuit 150.

In one embodiment, RF interface 140 may include a component or combination of components adapted for transmitting and/or receiving single carrier or multi-carrier modulated signals (e.g., including complementary code keying (CCK) and/or orthogonal frequency division multiplexing (OFDM) symbols) although the inventive embodiments are not limited to any specific over-the-air interface or modulation scheme. RF interface 140 may include, for example, a receiver 142, a transmitter 144 and/or a frequency synthesizer 146. Interface 140 may include bias controls, a crystal oscillator and/or one or more antennas 148 and/or 149. In another embodiment, RF interface 140 may use external voltage-controlled oscillators (VCOs), surface acoustic wave filters, intermediate frequency (IF) filters and/or RF filters, as desired. Due to the variety of potential RF interface designs an expansive description thereof is omitted.

Processing circuit 150 may communicate with RF interface 140 to process receive and/or transmit signals and may include, for example, an analog-to-digital converter 152 for down converting received signals, a digital-to-analog converter 154 for up converting signals for transmission. Further, processor circuit 150 may include a baseband or physical layer (PHY) processing circuit 156 for PHY link layer processing of respective receive/transmit signals. Processing circuit 150 may include, for example, a processing circuit 159 for medium access control (MAC)/data link layer processing. Processing circuit 150 may include a memory controller 158 for communicating with processing circuit 159 and/or a base station management entity 160, for example, via interfaces 155. Memory 157 may represent any type or volatile or non-volatile storage to store an index of logical resource unit (LRU) allocations, for example, as described hereinafter.

In some embodiments of the present invention, PHY processing circuit 156 may include a frame construction and/or detection module, in combination with additional circuitry such as a buffer memory, to construct and/or deconstruct super-frames as in the embodiments previously described. Alternatively or in addition, MAC processing circuit 159 may share processing for certain of these functions or perform these processes independent of PHY processing circuit 156. In some embodiments, MAC and PHY processing may be integrated into a single circuit if desired.

Apparatus 130 may be, for example, a base station, an access point, a subscriber station, a device, a terminal, a node, a hybrid coordinator, a wireless router, a NIC and/or network adaptor for computing devices, a mobile station or other device suitable to implement the inventive methods, protocols and/or architectures described herein. Accordingly, functions and/or specific configurations of apparatus 130 described herein, may be included or omitted in various embodiments of apparatus 130, as suitably desired. In some embodiments, apparatus 130 may be configured to be compatible with protocols and frequencies associated one or more of the IEEE 802.11, 802.15 and/or 802.16 standards for WLANs, WPANs and/or broadband wireless networks, cited herein, although the embodiments are not limited in this respect.

Embodiments of apparatus 130 may be implemented using single input single output (SISO) architectures. However, as shown in FIG. 2, certain implementations may include multiple antennas (e.g., antennas 148 and 149) for transmission and/or reception using adaptive antenna techniques for beamforming or spatial division multiple access (SDMA) and/or using multiple input multiple output (MIMO) communication techniques.

The components and features of station 130 may be implemented using any combination of discrete circuitry, application specific integrated circuits (ASICs), logic gates and/or single chip architectures. Further, the features of apparatus 130 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the example apparatus 130 shown in the block diagram of FIG. 2 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments of the present invention.

Figure 3:
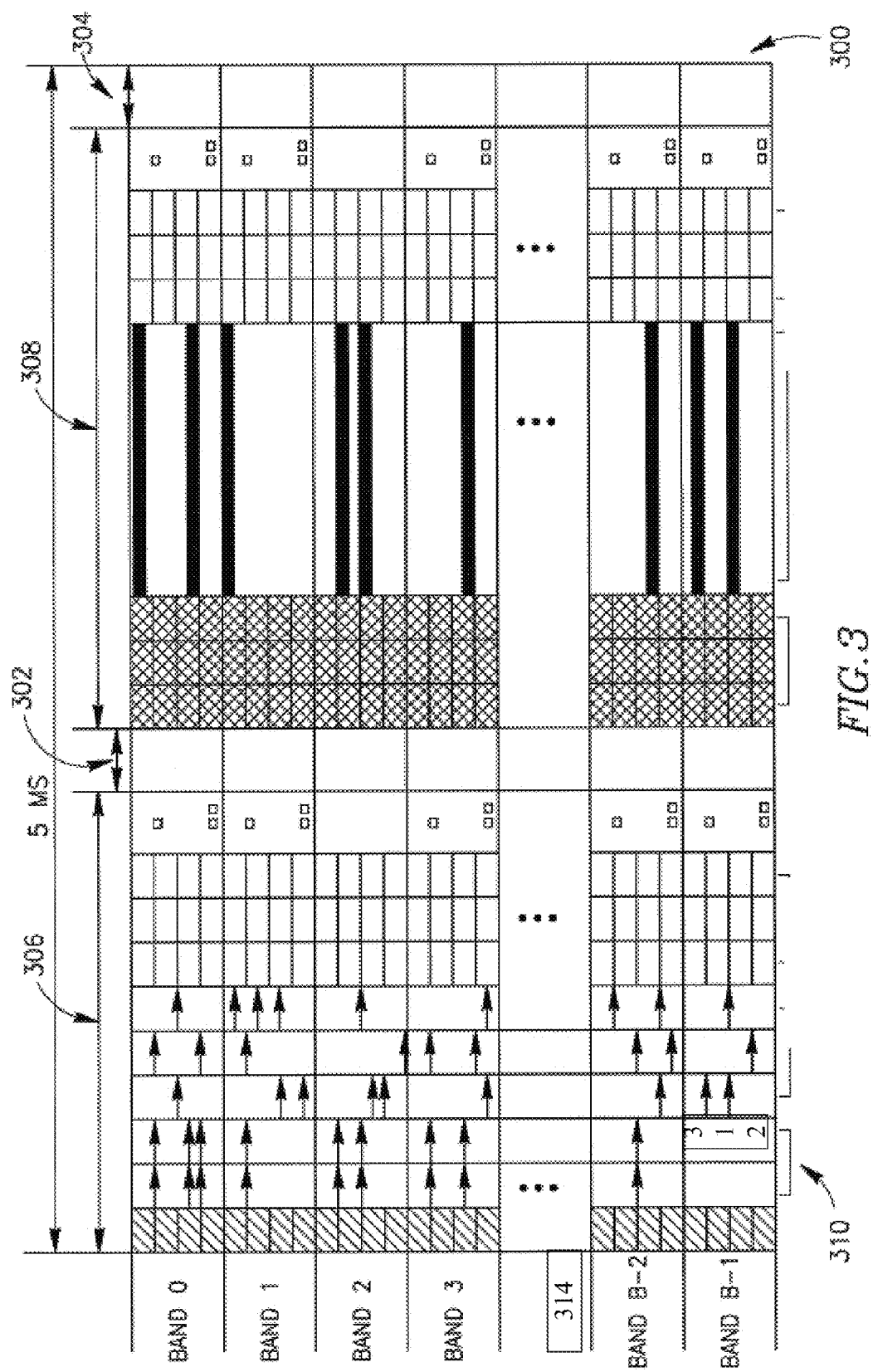
FIG. 3 is a schematic illustration of a frame structure according to an embodiment of the present invention.

Reference is made to FIG. 3, which schematically illustrates a frame 300 structure according to an embodiment of the present invention. Frame 300 (e.g., a radio frame) may be a portion of a transmitted and/or received communication in, for example, wireless network 100. In some embodiments, frame 300 may describe a periodically repeating segment structure of a larger communication signal or stream. In some embodiments, repeating frame 300 may include substantially different information, for example, during substantially each separate transmission. Frame 300 may be defined and may include broadband wireless access technology according to, for example, the IEEE Std 802.16-2009 or mobile WiMAX profiles. According to the mobile WiMAX profiles, the duration of frame 300 or transmission time interval (TTI) may be, for example, approximately 5 ms. Other frame or radio frame sizes such as for example 2, 2.5, 4, 8, 10, 12, and 20 ms may be used as for example specified in the IEEE Std 802.16-2009 specification.

In some embodiments, frame 300 may be transmitted and/or received, for example, according to a time division duplex (TDD) mode or scheme. Other time and/or frequency schemes may be used (e.g., such as a frequency division duplex (FDD) mode or scheme) according to embodiments of the invention.

Frame 300 may include an integer number of OFDM symbols or other multiplexing symbols. The number of OFDM symbols per frame may be determined, for example, according to a choice of OFDM numerology (e.g., sub-carrier spacing, cyclic prefix length, sampling frequency, etc.). In some embodiments, OFDM numerologies may be determined, set, or obtained, for example, depending, on a bandwidth and sampling frequency (e.g., or an over-sampling factor according to the mobile WiMAX profiles). In various embodiments, substantially different OFDM numerologies may be used, which may result in substantially different number of OFDM symbols in frame 300.

In some embodiments, frame 300 may include idle symbols and/or idle time slots. In one embodiment, frame 300 may include one or more switching periods 302 and/or 304, for example, for changing between a pre-designated downlink (DL) transmission 306 and a pre-designated uplink (UL) transmission 308 when a TDD duplex mode or scheme is used. In other embodiments, for example, when an FDD duplex scheme is used, since DL transmissions 306 and UL transmissions 308 may be sent substantially at the same or overlapping times (e.g., over different frequencies or network channels) frame 300 may include substantially few or no idle symbols, idle time slots, and/or switching periods 302 and/or 304.

Frame 300 may include a medium access protocol (MAP) transmission 310, preceding DL transmissions 306 and UL transmissions 308, which may provide information to connected mobile stations. MAP transmission 310 may include information element (IE) 312, which may include a resource index for allocating bandwidth. Sub-bands of the communication channel may be divided into logical resource units (LRU's), such as LRU 314, which may be allocated individually or in continuous groupings as described in more detail hereinafter.

Figures 4, 7:
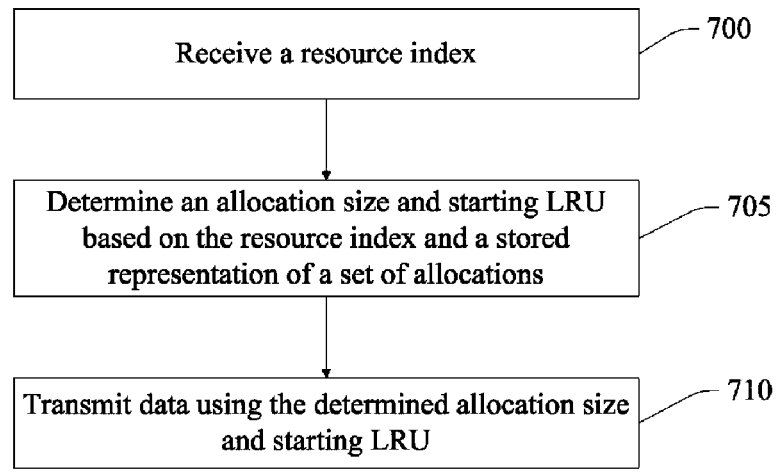
FIG. 4 is a table of logical resource unit allocations according to embodiments of the present invention.
FIG. 7 is a flow chart of a method according to an embodiment of the present invention.

Reference is made to FIG. 4, which is a table of logical resource unit allocations according to embodiments of the present invention. FIG. 4 lists LRU parameters for bandwidths of 5, 10 and 20 MHz. One aspect of the invention is to reduce the number of bits needed to represent LRU allocations. One skilled in the art would appreciate that reducing the number of bits needed to represent LRU allocations would tend to lower communication overhead and improve data throughput.

As shown, when only contiguous LRU's are indexed, the total number of allowable allocations (combinations) is Nmax*(Nmax+1)/2. In the case that all 24, 48, and 96 LRU's at 5 MHz, 10 MHz and 20 MHz, respectively, are allocated to one frequency partition, a total of 9, 11 and 13 bits are required to index each of these allocations, respectively.

According to embodiments of the invention, allocations may either be removed uniformly from each set corresponding to the allowable sizes or they may be restricted according to a set of predefined rules. In some embodiments, all possible locations corresponding to allocation sizes from 1 to 4 are retained in order to accommodate small packet sizes for applications such as VoIP. In some embodiments, all possible locations corresponding to allocation sizes from Nmax−4 to Nmax are retained to allow all locations to be signaled for large data packets. In some embodiments, the set of allowable allocations is reduced by uniformly removing indices from the sets of indices corresponding to allocation sizes from 5 to Nmax−5. In some embodiments, the set of allowable allocations is reduced by removing all indices of certain sizes from the sets of indices corresponding to allocation sizes from 5 to Nmax−5.

While FIG. 4 shows the number of allocations removed from an allowable set to achieve a lower bit representation of the reduced set of allocations (e.g. removal of 44 allocations for 5 MHz bandwidth to reduce the number of bits from 9 to 8), more allocations may be removed to achieve other bit representations. Also, in some embodiments, reduced sets of allocations may be used for some bandwidths while the full set of allowable allocations may be used for other bandwidths (e.g. an 11 bit index of allocations may be used for both 10 MHz and 20 MHz).

In one embodiment, in the case of 5 MHz bandwidth (24 LRU's), all 24 allocations of size 1 (i.e. 1, 2, . . . , 24), all 23 allocations of size 2 (i.e. 1~2, 2~3, . . . , 23~24), all 22 allocations of size 3, all 21 allocations of size 4, all 4 allocations of size 21, all 3 allocations of size 22, both allocations of size 23 (i.e. 1~23 and 2~24), and the allocation of size 24 (i.e. 1~24) are retained and 44 allocations are uniformly removed between allocations sizes 5 and 20.

Figure 5:
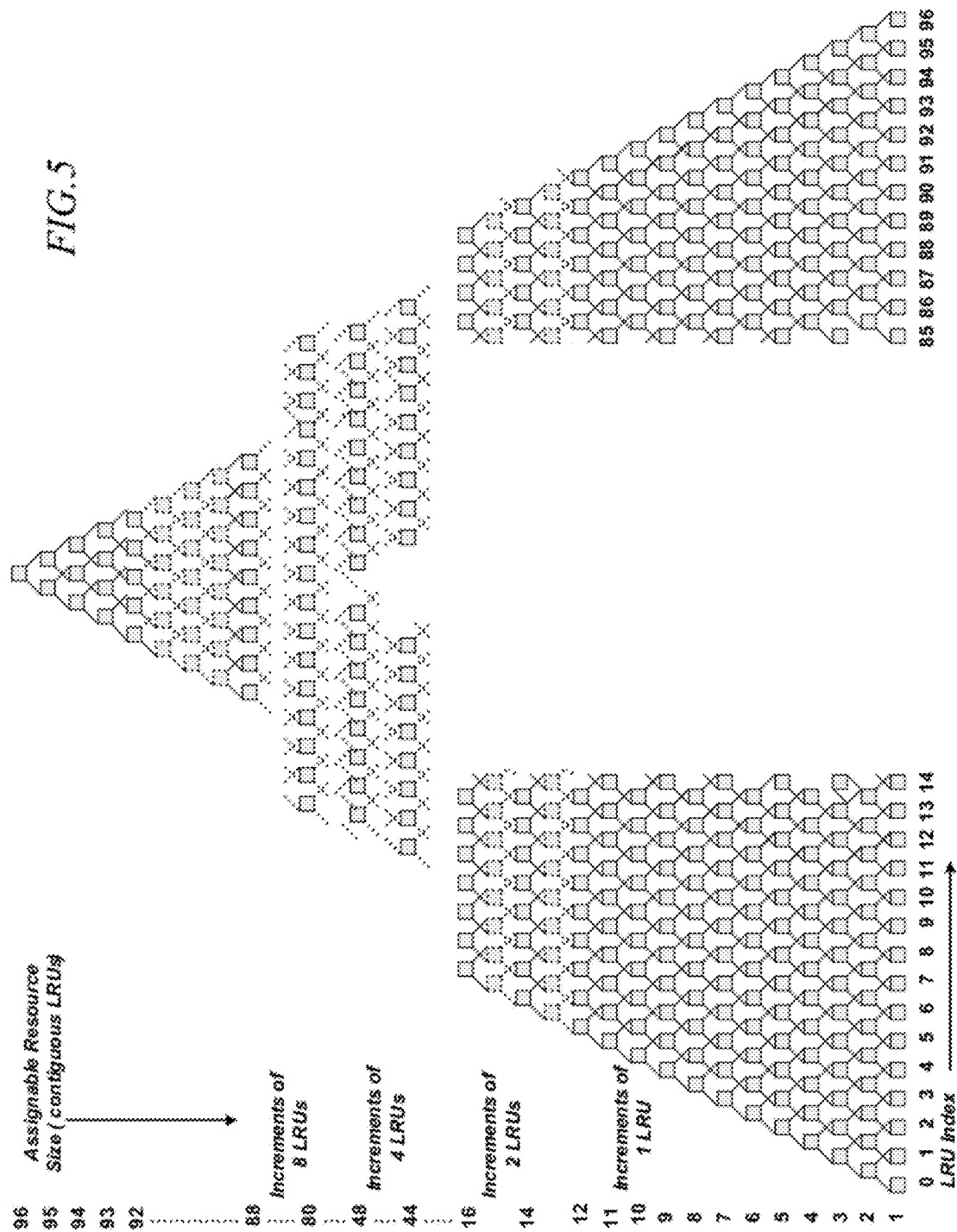
FIG. 5 is an assignment structure for 11-bit resource indexing for 20 MHz according to embodiments of the present invention.

Reference is made to FIG. 5, which is an assignment structure for 11-bit resource indexing for 20 MHz according to embodiments of the present invention. As shown, allocations corresponding to certain allocation sizes are removed to provide an 11-bit resource index. In this example embodiment all resource sizes in increments of 1 LRU are assignable in the range of 1 to 12 LRU's with full flexibility in order to support scheduling of small allocations for applications such as VoIP, only even resource sizes are assignable in increments of 2 LRU's from sizes of 12 to 24 LRU's, resource sizes are assignable in increments of 4 LRU's for sizes 24 to 48 LRU's, resource sizes are assignable in increments of 8 LRU's for sizes 48 to 88 LRU's, and all resource sizes from 92 to 96 LRU's are indexed with no constraints on location in order to allow full flexibility in scheduling large allocations transmitted at the peak data rate.

The base station and mobile station also maintain (for example in memory 157) a vector $I_a$ of length $N_{max}$ in which the non-zero entries contain the starting index for each of the K=34 assignable resource sizes shown in FIG. 5. The 11 bit resource indices in $I_a$ run from 0 through 2047 and the entries in $I_a$ are calculated as 0, (0+96−1), (0+96+95−1), (0+96+95+94−1), ..., 0, 0, (2047−2−3−4−9−17−25), 0, 0, 0, 0, 0, 0, 0, (2047−2−3−4−9−17), 0, 0, 0, 0, 0, 0, 0, (2047−2−3−4−9), 0, 0, 0, (2047−2−3−4−5), (2047−2−3−4), (2047−2−3), (2047−2), 2047.

Specifically, the $i^{th}$ element of $I_a$, [1≦i≦96] 1≦i≦96 for 11 bit resource indexing for 20 MHz is defined as $$I_a(S) = \begin{cases} 0 & i = 1 \\ I_a(i-1) + (96-(i-1)+1) & 2 \le i \le 12 \\ I_a(i-2) + (96-(i-2)+1) & i = 2k, 7 \le k \le 12 \\ I_a(i-4) + (96-(i-4)+1) & i = 4k, 7 \le k \le 12 \\ I_a(i-8) + (96-(i-8)+1) & i = 8k, 7 \le k \le 11 \\ 2048 - \sum_{k=i}^{96}(96-k+1) & 92 \le i \le 96 \\ 0 & \text{otherwise} \end{cases}$$

The resource index RA for an allocation of size S LRUs beginning at LRU L is computed as $$RI = \begin{cases} I_a(S) + L & \text{if } I_a(S) = 0 \\ notassignable & \text{if } I_a(S) = 0 \text{ and } S > 1 \end{cases}$$

where $1 \le S \le 96$, $0 \le L \le 95$, and $(S+L) \le 96$

The base station first determines if the required resource size is assignable by checking if the $S^{th}$ element in $I_a$ has a non-zero value or S=1. If the size S is assignable, then the 11 bit resource index is then determined by simply adding L to the value of the $S^{th}$ element in $I_a$. If the required resource is not assignable, the next higher or lower non-zero element in $I_a$ is selected based on the link adaptation scheme employed.

Note that the same scheme can be applied to the 5 and 10 Mhz system bandwidths where the length of $I_a$ is 24 and 48 respectively and all values in $I_a$ correspond to non-zero indices for every allocation size.

The $i^{th}$ element of $I_a$, for 9 bit resource indexing for 5 MHz is defined as:

$$I_a(i) = \begin{cases} 0 & i = 1 \\ I_a(i-1) + (24-(i-1)+1) & 2 \le i \le 24 \end{cases}$$

The resource index RI for an allocation of size S LRUs beginning at LRU L is computed as $[RI=I_a(S)+L, 1 \le S \le 24, 0 \le L \le 23, \text{ and } (S+L) \le 24]$ $RI=I_a(S)+L, 1 \le S \le 24, 0 \le L \le 23, \text{ and } (S+L) \le 24$ Similarly, the $i^{th}$ element of $I_a$, for 11 bit resource indexing for 10 MHz are defined as:

$$I_a(i) = \begin{cases} 0 & i = 1 \\ I_a(i-1) + (48-(i-1)+1) & 2 \le i \le 48 \end{cases}$$

$RI = I_a(S) + L, 1 \le S \le 48, 0 \le L \le 47, \text{ and } (S+L) \le 48$

At the mobile station the 11 bit index, RI in the MAP is decoded as follows. The value of element S in $I_a$ with the smallest value equal to or less than the decimal value of the index is used to determine the assigned resource size S. Let this value be $I_a(i)$.

The starting LRU for the allocation is determined by subtracting the value of the $S^{th}$ element in $I_a$ from the decimal value of the index in the MAP, i.e., $$L = RI - I_a \qquad (i)$$

Figure 6:
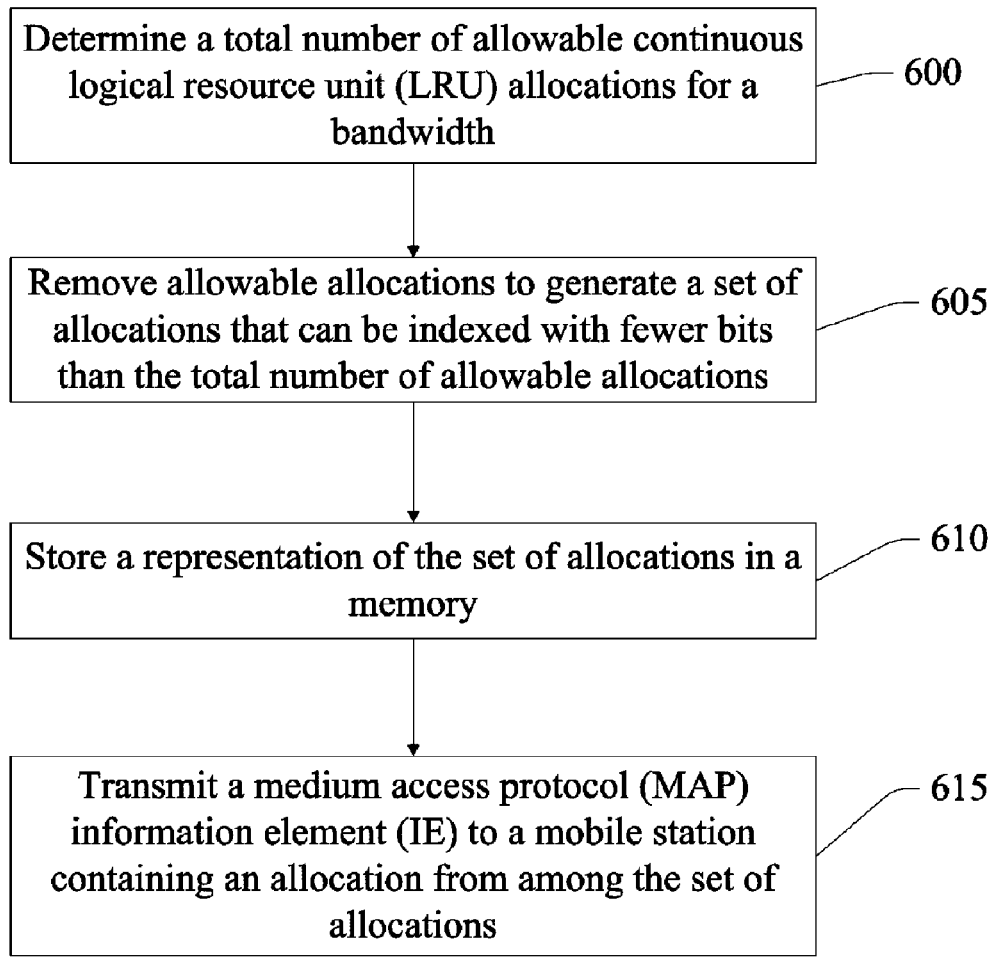
FIG. 6 is a flow chart of a method according to an embodiment of the present invention.

Reference is made to FIG. 6, which is a flow chart of a method according to an embodiment of the present invention.

In operation 600, a total number of allowable continuous LRU allocations for a bandwidth is determined (e.g. as described in reference to FIG. 4).

In operation 605, allowable allocations are removed to generate a set of allocations that can be indexed with fewer bits than the total number of allowable allocations can be indexed (e.g. as described in reference to FIG. 5).

In operation 610, a representation of the set of allocations is stored in a memory (e.g., as described in reference to FIG. 5).

In operation 615, a MAP IE is transmitted to a mobile station containing an allocation from among the set of allocations (e.g., IE 312, described in reference to FIG. 3).

Reference is made to FIG. 7, which is a flow chart of a method according to an embodiment of the present invention.

In operation 700, a mobile station may receive a resource index (e.g., IE 312, described in reference to FIG. 3).

In operation 705, the mobile station may determine an allocation size and starting LRU based on the resource index and a stored representation of a set of allocations (e.g., as described in reference to FIG. 5).

In operation 710, the mobile station may transmit data using the determined allocation size and starting LRU (e.g., pre-designated UL transmissions 308, described in reference to FIG. 3)

While the invention has been described with respect to a limited number of embodiments, it will be appreciated that many variations, modifications and other applications of the invention may be made. Embodiments of the present invention may include other apparatuses for performing the operations herein. Such apparatuses may integrate the elements discussed, or may comprise alternative components to carry out the same purpose. It will be appreciated by skilled in the art that the appended claims are intended to cover all such modifications and changes as fall within the true spirit of the invention.

The invention claimed is:

1. A method for resource allocation in a broadband wireless network comprising:
   determining a total number of allowable logical resource unit (LRU) allocations for a bandwidth, the total number based on allowable allocation sizes, the allowable LRU allocations comprising combinations of one or more continuous LRUs within the bandwidth ranging from allocations that comprise single LRUs to an allocation comprising a maximum number of continuous LRUs;
   removing some of the allowable LRU allocations to generate a reduced set of allowable LRU allocations that can be indexed with a resource index that has with fewer bits than required for the total number of allowable LRU allocations including non-continuous allocations; and
   transmitting an information element (IE) that includes the resource index to allocate one or more of the LRUs of the reduced set to allocate bandwidth.

2. The method of claim 1, further comprising retaining substantially all allowable combinations of continuous LRUs with the largest and smallest allocation sizes.

3. The method of claim 1, wherein the bandwidth comprises 5 MHz and the set of allocations can be indexed with no more than 8 or 9 bits.

4. The method of claim 1, wherein the bandwidth comprises 10 MHz and the set of allocations can be indexed with no more than 10 or 11 bits.

5. The method of claim 1, wherein the bandwidth comprises 20 MHz and the set of allocation can be indexed with no more than 11 or 12 bits.

6. The method of claim 1, wherein removing allowable allocations comprises removing combinations of LRUs with a substantially uniform separation.

7. The method of claim 1, wherein removing allowable allocations comprises removing all allocations of selected allocation sizes.

8. The method of claim 1, further comprising transmitting a medium access protocol (MAP) information element (IE) to a mobile station containing an allocation from among the set of allocations.

9. An apparatus method for resource allocation in a broadband wireless network comprising:
   radio-interface circuitry; and
   processing circuitry to determine a total number of allowable logical resource unit (LRU) allocations for a bandwidth, the total number based on allowable allocation sizes, the allowable LRU allocations comprising combinations of one or more continuous LRUs within the bandwidth ranging from allocations that comprise single LRUs to an allocation comprising a maximum number of continuous LRUs,
   wherein the processing circuitry is to remove some of the allowable LRU allocations to generate a reduced set of allowable LRU allocations that can be indexed with a resource index that has with fewer bits than required for the total number of allowable LRU allocations including non-continuous allocations, and
   wherein the radio-interface circuitry is to transmit an information element (IE) that includes the resource index to allocate one or more of the LRUs of the reduced set to allocate bandwidth.

* * * * *